US009308927B2

(12) United States Patent
Weaver

(10) Patent No.: US 9,308,927 B2
(45) Date of Patent: Apr. 12, 2016

(54) CART ASSEMBLY FOR TRANSPORTING A BUCKET

(71) Applicant: Weaver, LLC, Rochester Hills, MI (US)

(72) Inventor: Dean Weaver, Rochester Hills, MI (US)

(73) Assignee: Weaver, LLC, Rochester Hills, MI (US)

( * ) Notice: Subject to any disclaimer, the term of this patent is extended or adjusted under 35 U.S.C. 154(b) by 0 days.

(21) Appl. No.: 14/813,405

(22) Filed: Jul. 30, 2015

(65) Prior Publication Data
US 2016/0031463 A1  Feb. 4, 2016

Related U.S. Application Data

(60) Provisional application No. 62/032,690, filed on Aug. 4, 2014.

(51) Int. Cl.
B62B 3/10 (2006.01)
B62B 1/26 (2006.01)
B62B 1/12 (2006.01)
B62B 5/06 (2006.01)
B62B 1/14 (2006.01)

(52) U.S. Cl.
CPC ............... B62B 1/264 (2013.01); B62B 1/125 (2013.01); B62B 1/14 (2013.01); B62B 3/104 (2013.01); B62B 5/067 (2013.01)

(58) Field of Classification Search
CPC .................... B62B 3/104; B62B 2202/028
See application file for complete search history.

(56) References Cited

U.S. PATENT DOCUMENTS

| 1,738,096 | A | * | 12/1929 | Cole | B62B 3/104 248/129 |
| 2,250,475 | A | * | 7/1941 | Ernst | B62B 3/104 254/131 |
| 2,385,514 | A | * | 9/1945 | Hawkins | B62B 3/104 280/10 |
| 2,816,674 | A | * | 12/1957 | Koontz | B62B 3/104 414/457 |
| 3,278,218 | A | * | 10/1966 | Lebre | B62B 1/264 294/103.1 |
| 5,035,438 | A | * | 7/1991 | Cronquist | B62B 3/104 248/129 |
| 6,454,281 | B1 | * | 9/2002 | Pearson | B62B 1/125 280/47.26 |
| 6,715,627 | B1 | * | 4/2004 | Bonner | A47J 47/18 220/23.87 |
| 2015/0001820 | A1 | * | 1/2015 | Cormier | B62B 1/22 280/47.26 |

* cited by examiner

Primary Examiner — Jeffrey J Restifo
Assistant Examiner — Erez Gurari
(74) Attorney, Agent, or Firm — Buckert Patent & Trademark Law Firm, PC; John F. Buckert

(57) ABSTRACT

A cart assembly having a frame assembly, a telescoping handle assembly, and first and second wheels is provided. The telescoping handle assembly is slidably coupled to a first end portion of the frame assembly. The first and second wheels are rotatable coupled to a second end portion of the frame assembly. The cart assembly further includes a first bucket mounting plate that extends outwardly from the frame assembly. The first bucket mounting plate has an arcuate-shaped surface that abuts against a first portion of an outer surface of the bucket. The cart assembly further includes a first bolt that extends through a first aperture of the frame assembly, a first aperture in the first bucket mounting plate, and a first aperture in the bucket to the couple together the frame assembly, the first bucket mounting plate, and the bucket.

8 Claims, 19 Drawing Sheets

CART ASSEMBLY FOR TRANSPORTING A BUCKET

CROSS-REFERENCE TO RELATED APPLICATIONS

This application claims priority to U.S. Provisional Patent Application No. 62/032,690 filed on Aug. 4, 2014, the entire contents of which are hereby incorporated by reference herein.

BACKGROUND

The inventor herein has recognized a need for an improved cart assembly for transporting a bucket.

SUMMARY

A cart assembly for transporting a bucket in accordance with an exemplary embodiment is provided. The bucket has first and second apertures extending therethrough. The cart assembly includes a frame assembly, a telescoping handle assembly, and first and second wheels. The frame assembly has first and second apertures extending therethrough. The telescoping handle assembly is slidably coupled to a first end portion of the frame assembly. The first and second wheels are rotatable coupled to a second end portion of the frame assembly. The cart assembly further includes a first bucket mounting plate that is coupled to the frame assembly that extends outwardly from the frame assembly. The first bucket mounting plate has an arcuate-shaped surface configured to abut against a first portion of an outer surface of the bucket. The first bucket mounting plate has a first aperture extending therethrough. The cart assembly further includes a first bolt configured to extend through the first aperture of the frame assembly, the first aperture in the first bucket mounting plate, and the first aperture in the bucket to the couple together the frame assembly, the first bucket mounting plate, and the bucket. The cart assembly further includes a second bucket mounting plate that is coupled to the frame assembly and extends outwardly from the frame assembly. The second bucket mounting plate has an arcuate-shaped surface configured to abut against a second portion of the outer surface of the bucket. The second bucket mounting plate has a first aperture extending therethrough. The cart assembly further includes a second bolt configured to extend through the second aperture of the frame assembly, the first aperture in the second bucket mounting plate, and the second aperture in the bucket to the couple together the frame assembly, the second bucket mounting plate, and the bucket.

A method of coupling a cart assembly to a bucket in accordance with another exemplary embodiment is provided. The bucket has first and second apertures extending therethrough. The method further includes providing a frame assembly having a frame assembly, a telescoping handle assembly, and first and second wheels. The frame assembly has first and second apertures extending therethrough. The telescoping handle assembly is slidably coupled to a first end portion of the frame assembly. The first and second wheels are rotatably coupled to a second end portion of the frame assembly. The method includes providing a first bucket mounting plate having an arcuate-shaped surface. The first bucket mounting plate further includes a first aperture extending therethrough. The method further includes providing a second bucket mounting plate having an arcuate-shaped surface. The second bucket mounting plate further includes a first aperture extending therethrough. The method further includes disposing the first bucket mounting plate against the frame assembly and further disposing the arcuate-shaped surface of the first bucket mounting plate against a first portion of an outer surface of the bucket. The method further includes inserting a first bolt through the first aperture of the frame assembly, the first aperture in the first bucket mounting plate, and the first aperture in the bucket to the couple together the frame assembly, the first bucket mounting plate, and the bucket. The method further includes disposing the second bucket mounting plate against the frame assembly and further disposing the arcuate-shaped surface of the second bucket mounting plate against a second portion of the outer surface of the bucket. The method further includes inserting a second bolt through the second aperture of the frame assembly, the first aperture in the second bucket mounting plate, and the second aperture in the bucket to the couple together the frame assembly, the second bucket mounting plate, and the bucket.

DETAILED DESCRIPTION

Figure 1:
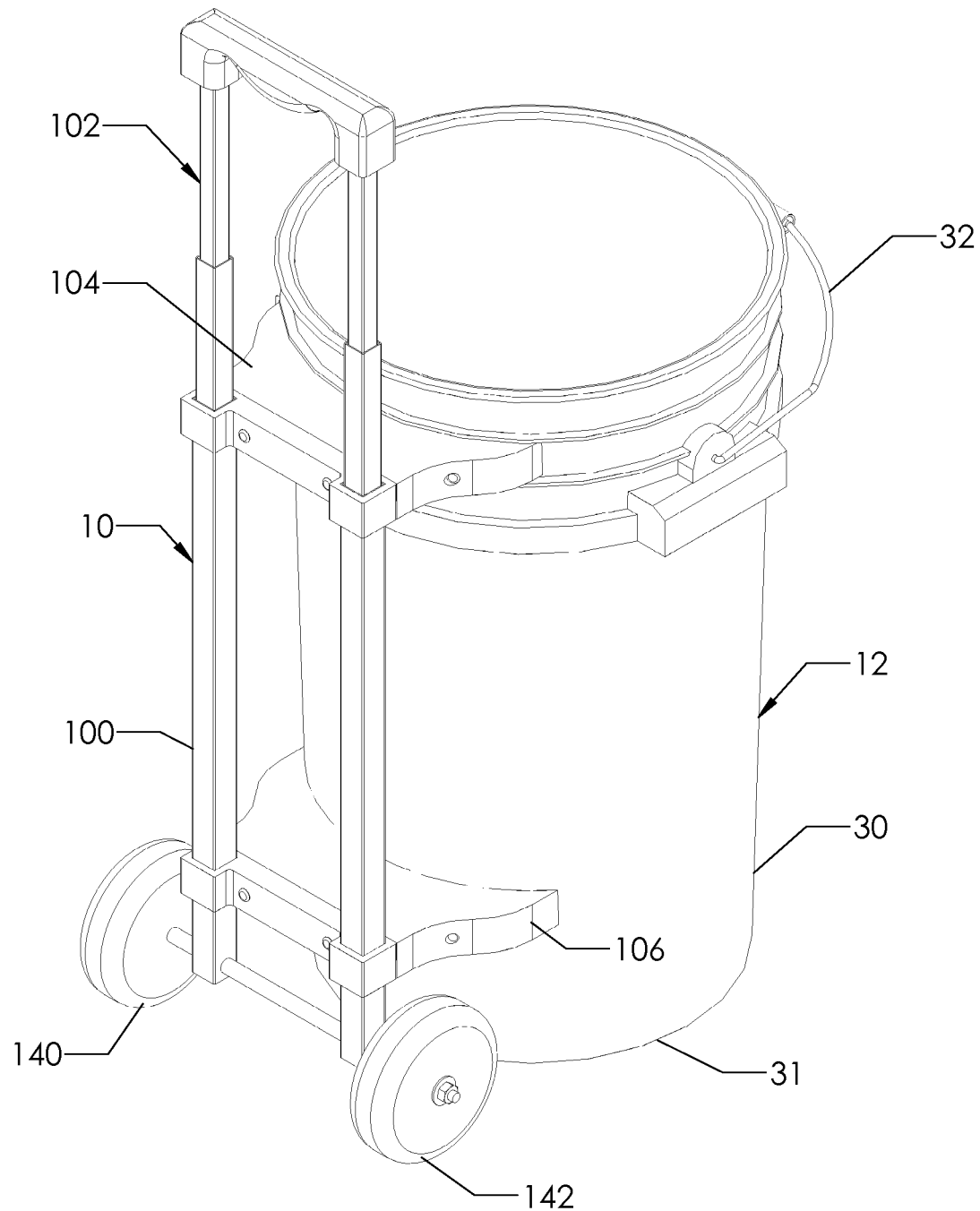
FIG. 1 is a schematic of a cart assembly coupled to a bucket in accordance with an exemplary embodiment.

Referring to FIGS. 1-7, a cart assembly 10 for transporting a bucket 12 in accordance with an exemplary embodiment is provided.

The bucket 12 includes a substantially tubular body 30, a bottom wall 31, and a handle 32. The bottom wall 31 is coupled to a bottom end of the substantially tubular body 30 and encloses the bottom end of the body 30. The handle 32 is coupled to the substantially tubular body 30. The body 30 has an outer surface 34 with ribs 40, 42, 44, 46 disposed around a periphery of the outer surface 34 and extending outwardly from the outer surface 34. The body 30 has apertures 60, 62, 64, 66, 70, 72, 74, 76 (shown in FIG. 4) extending therethrough. In an exemplary embodiment, the body 30 is constructed of plastic. However, in an alternative embodiment, the body 30 could be constructed of other materials such as a wood or a steel alloy for example.

Figure 4:
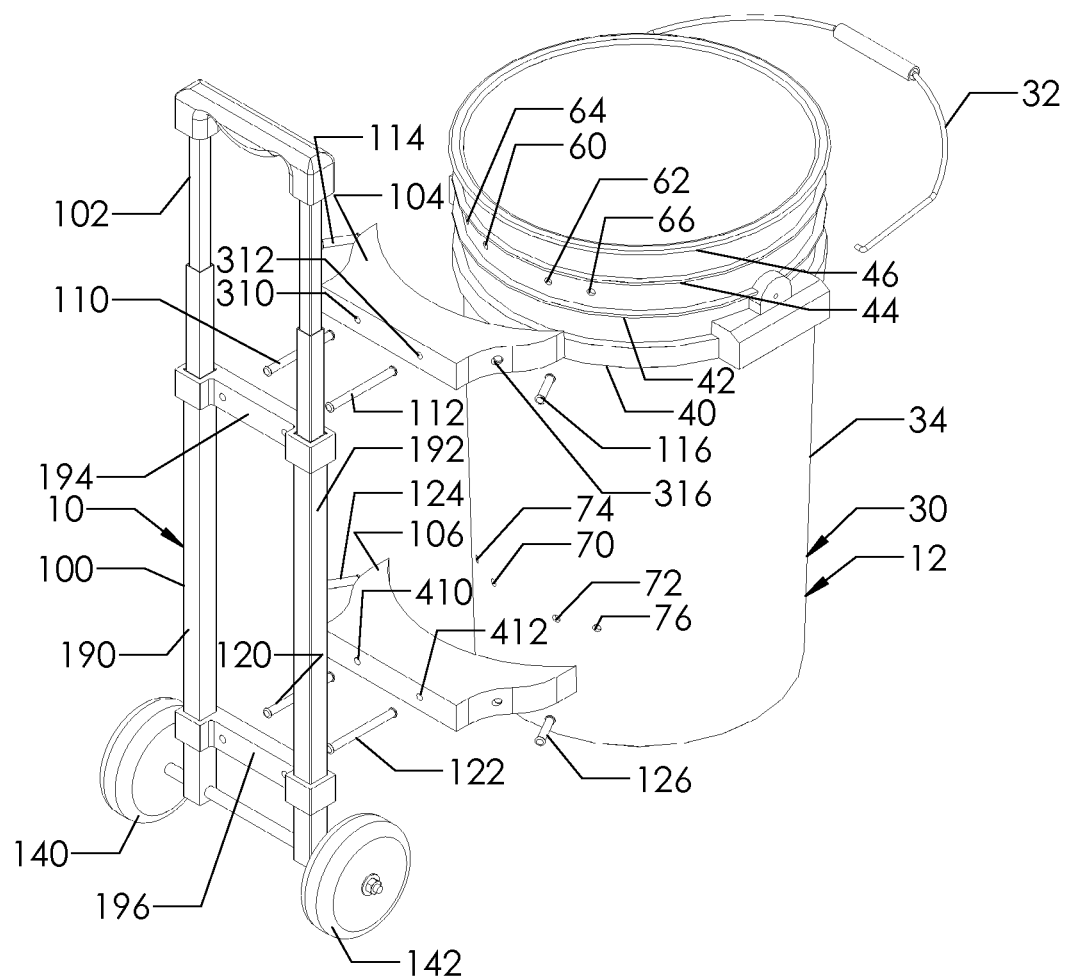
FIG. 4 is an exploded schematic of the cart assembly of FIG. 1, and the bucket.
Figure 5:
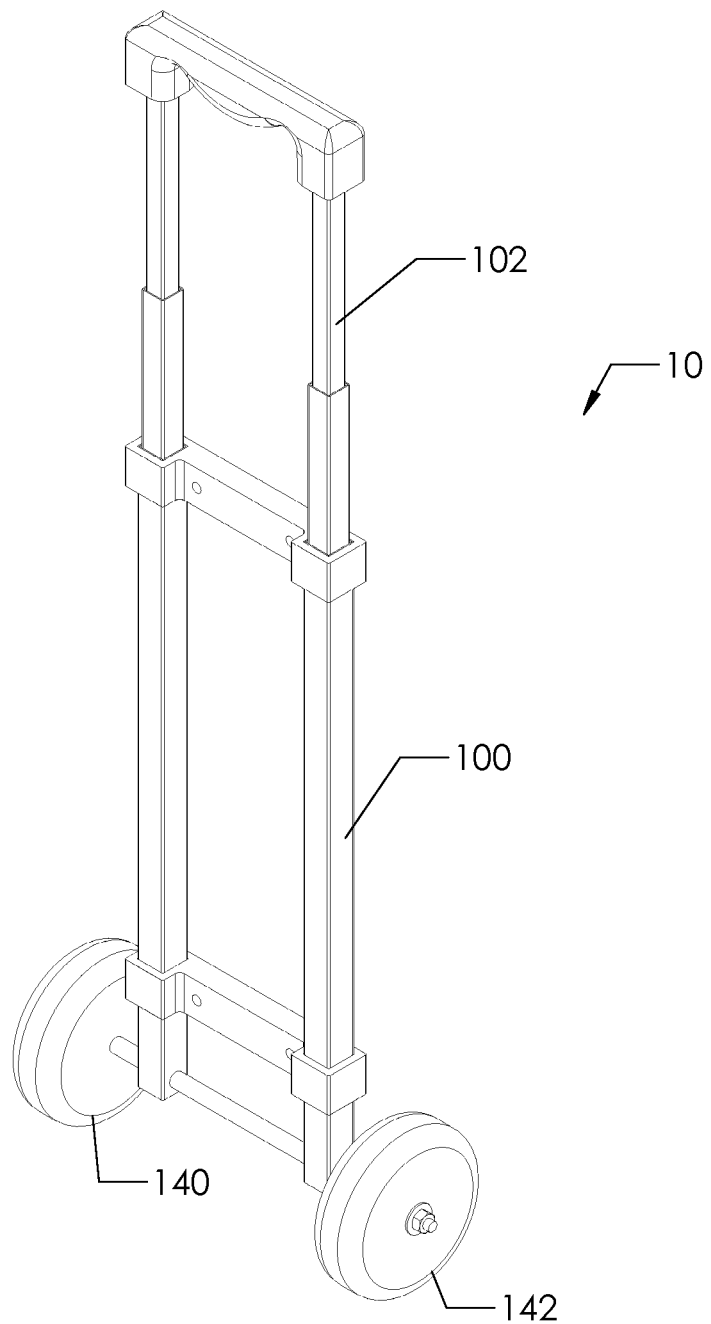
FIG. 5 is a schematic of a portion of the cart assembly of FIG. 1 having a handle assembly in an extended operational position.
Figure 7:
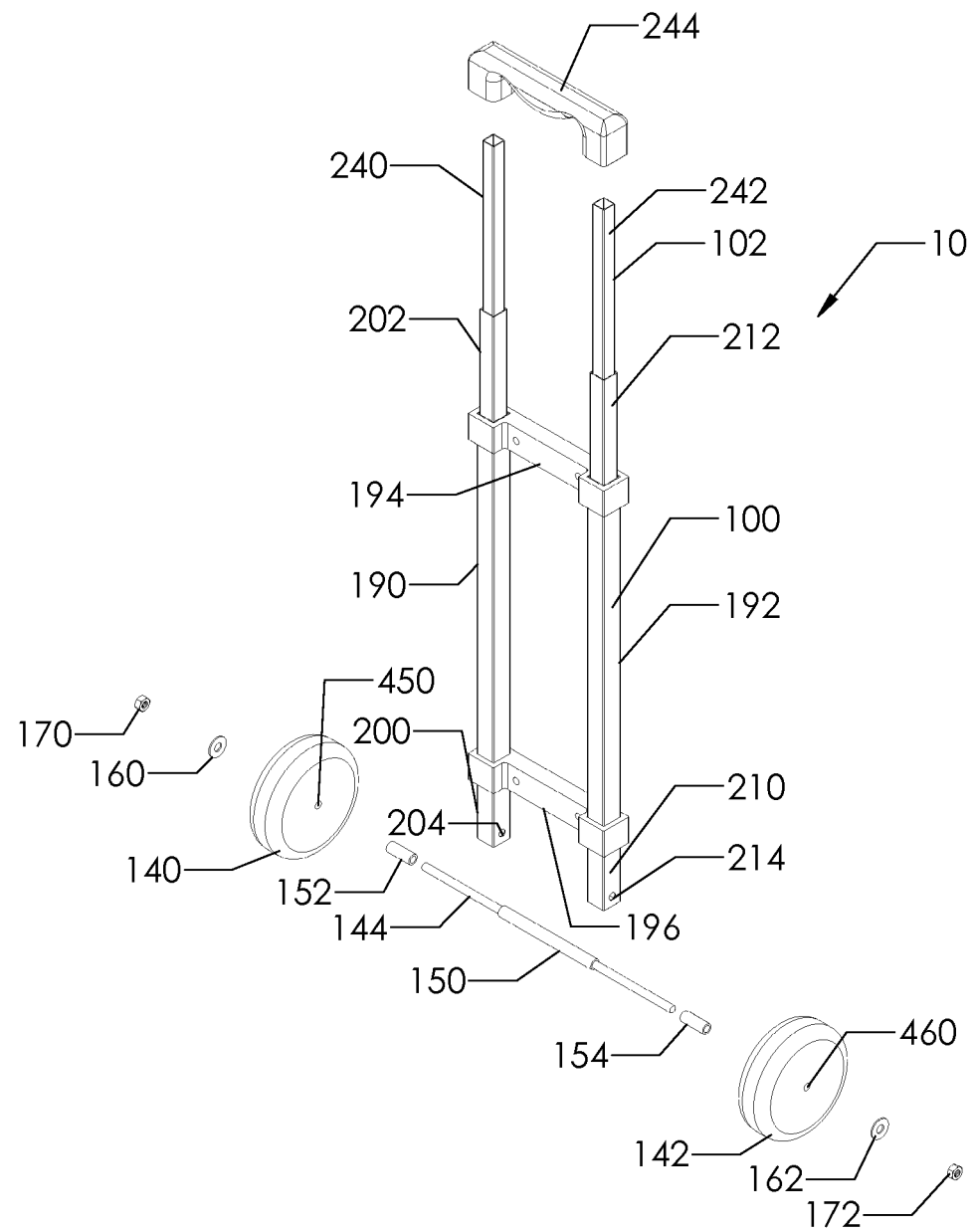
FIG. 7 is an exploded schematic of a portion of the cart assembly of FIG. 1.

Referring to FIGS. 4 and 7, the cart assembly 10 is provided to allow a user to transport the bucket 12 from a first position to a second position. The cart assembly 10 includes a frame assembly 100, a telescoping handle assembly 102, first and second bucket mounting plates 104, 106, bolts 110, 112, 114, 116, 120, 124, 126, first and second wheels 140, 142, an axle 144, bushings 150, 152, 154, washers 160, 162, and nuts 170, 172.

The frame assembly 100 has first and second tubular support members 190, 192 and first and second cross-members 194, 196. The first and second tubular support members 190, 192 extend substantially parallel to one another.

The first tubular support member 190 has a first end 200 and a second end 202 and a first longitudinal axis 205. The first tubular support member 190 has an axle aperture 204 extending therethrough proximate to the first end 200 thereof. In an exemplary embodiment, the first tubular support member 190 is constructed of aluminum. However, in an alternative embodiment, the first tubular support member 190 could be constructed of other materials such as steel or plastic for example.

The second tubular support member 192 has a first end 210 and a second end 212 and a second longitudinal axis 215. The second tubular support member 190 has an axle aperture 214 extending therethrough proximate to the first end 210 thereof. In an exemplary embodiment, the second tubular support member 192 is constructed of aluminum. However, in an alternative embodiment, the second tubular support member 192 could be constructed of other materials such as steel or plastic for example.

Figure 2:
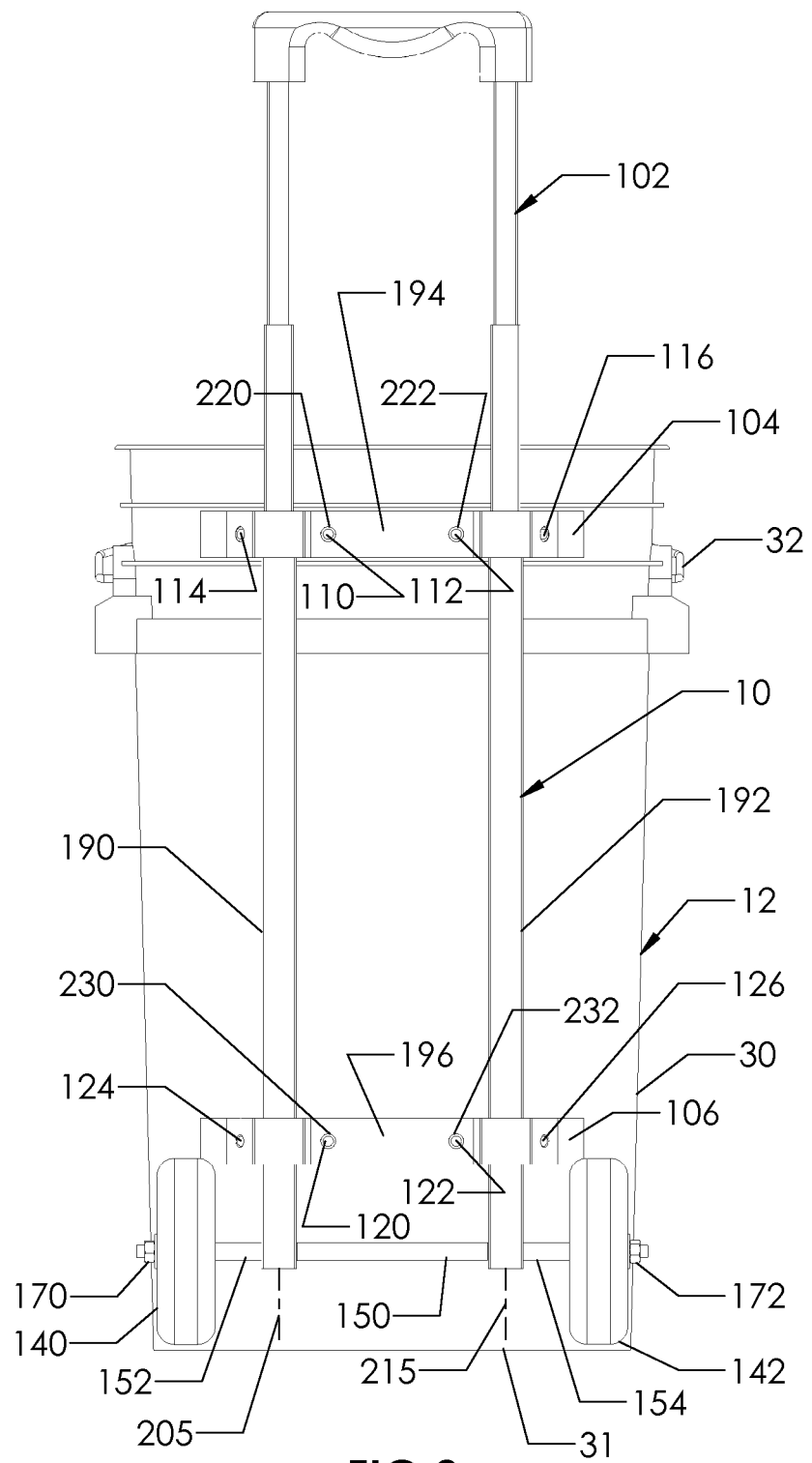
FIG. 2 is a rear schematic of the cart assembly and the bucket of FIG. 1.
Figure 3:
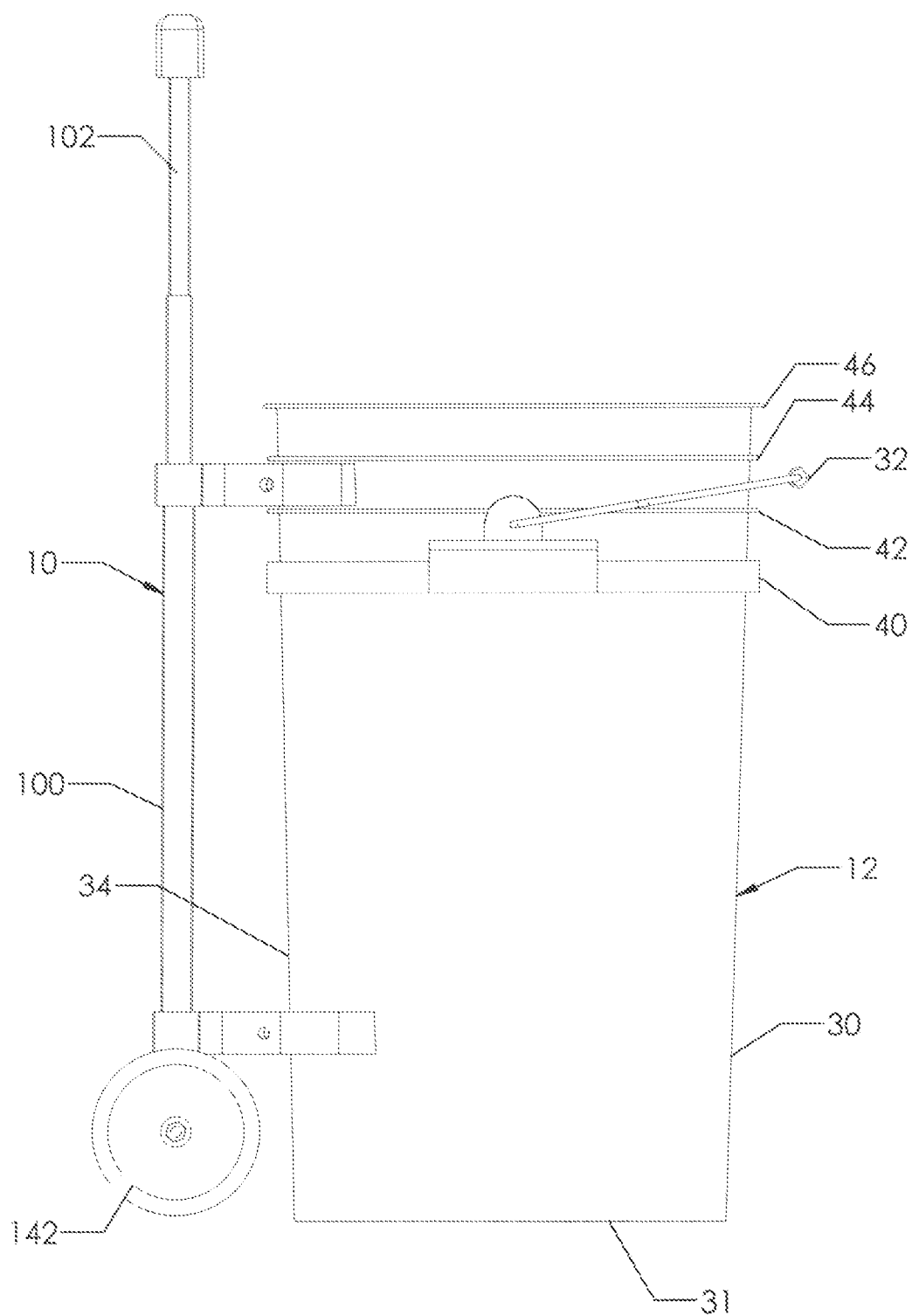
FIG. 3 is a side schematic of the cart assembly and the bucket of FIG. 1.

Referring to FIGS. 2, 4 and 7, the first cross-member 194 is coupled to both of the first and second tubular support members 190, 192. The first cross-member 194 includes apertures 220, 222 extending therethrough. In an exemplary embodiment, the first cross-member 194 is constructed of aluminum. However, in an alternative embodiment, the first cross-member 194 could be constructed of other materials such as steel or plastic for example.

The second cross-member 196 is coupled to both of the first and second tubular support members 190, 192. The second cross-member 196 includes apertures 230, 232 extending therethrough. In an exemplary embodiment, the second cross-member 196 is constructed of aluminum. However, in an alternative embodiment, the second cross-member 196 could be constructed of other materials such as steel or plastic for example.

Figure 6:
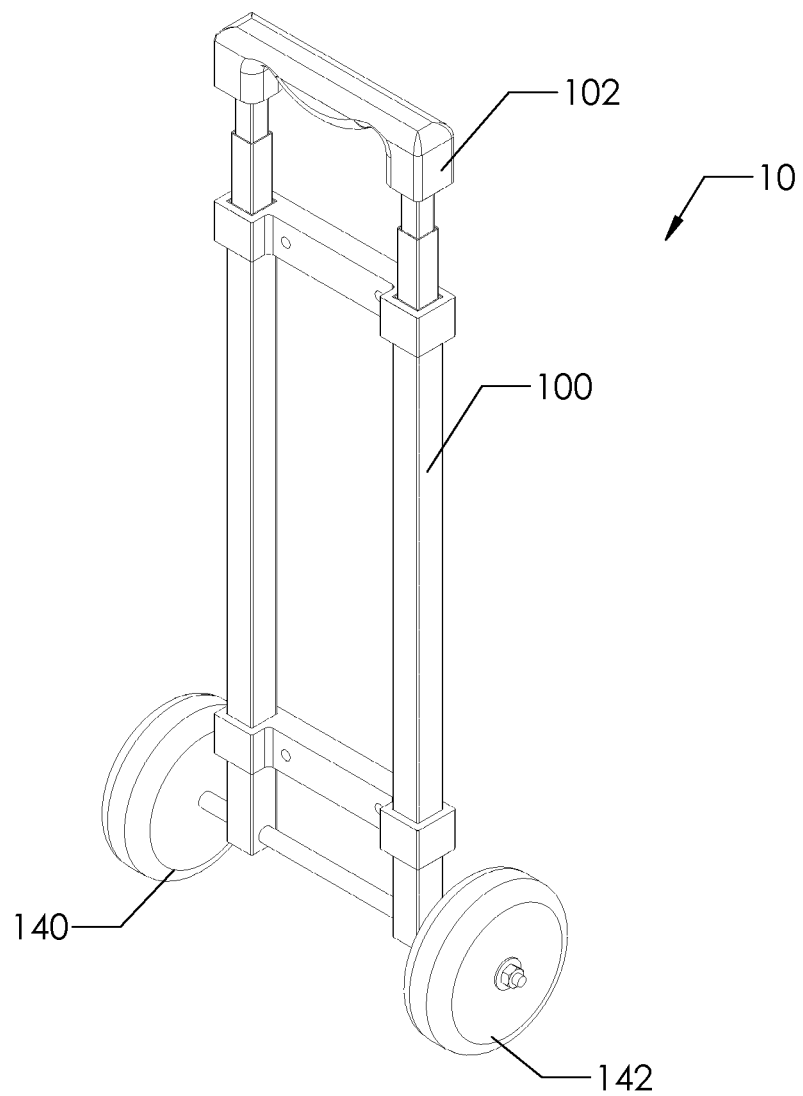
FIG. 6 is a schematic of a portion of the cart assembly of FIG. 1 having the handle assembly in a non-extended operational position.

The telescoping handle assembly 102 is slidably coupled to a first end portion of the frame assembly 100 and has an extended operational position (shown in FIG. 5) and a non-extended operational position (shown in FIG. 6). The telescoping handle assembly 102 includes first and second extension members 240, 242 and a handle member 242. The first and second extension members 240, 242 are slidably disposed in the first and second tubular support members 190, 192, respectively. The handle member 244 is coupled to the first and second extension members 240, 242. In an exemplary embodiment, the first and second extension members 240, 242 are constructed of aluminum. However, in an alternative embodiment, the first and second extension members 240, 242 could be constructed of other materials such as steel or plastic for example. Further, in an exemplary embodiment, the handle member 244 is constructed of plastic. In an alternative embodiment, the handle member 244 could be constructed of other material such as aluminum or steel.

Referring to FIGS. 1 and 8-12, the first bucket mounting plate 104 is provided to couple the frame assembly 100 to the bucket 12. The first bucket mounting plate 104 has an arcuate-shaped surface 260, a substantially flat mounting surface 262, first and second side surfaces 264, 266, a top surface 268, and a bottom surface 270. The first bucket mounting plate 104 further includes a longitudinal axis 320 extending through the substantially flat mounting surface 262 and the arcuate-shaped surface 260. The substantially flat mounting surface 262 is disposed opposite to the arcuate-shaped surface 260. The first and second side surfaces 264, 266 extend between the substantially flat mounting surface 262 and the arcuate-shaped surface 260. The first bucket mounting plate 104 further includes apertures 310, 312, 314, 316 extending therethrough. The apertures 310, 312 extend from the substantially flat mounting surface 262 to the arcuate-shaped surface 260 substantially parallel to the axis 320. The aperture 314 extends from the first side surface 264 to the arcuate-shaped surface 260 at an acute angle relative to the longitudinal axis 320. The aperture 314 is centered about an axis 322. The aperture 316 extends from the second side surface 266 to the arcuate-shaped surface 260 at an acute angle relative to the longitudinal axis 320. The aperture 316 is centered about an axis 324. The top surface 268 and the bottom surface 270 extend substantially parallel to one another. In an exemplary embodiment, the first bucket mounting plate 104 is constructed of plastic. However, in an alternative embodiment, the first bucket mounting plate 104 could be constructed of other materials such as aluminum or steel for example.

Figure 8:
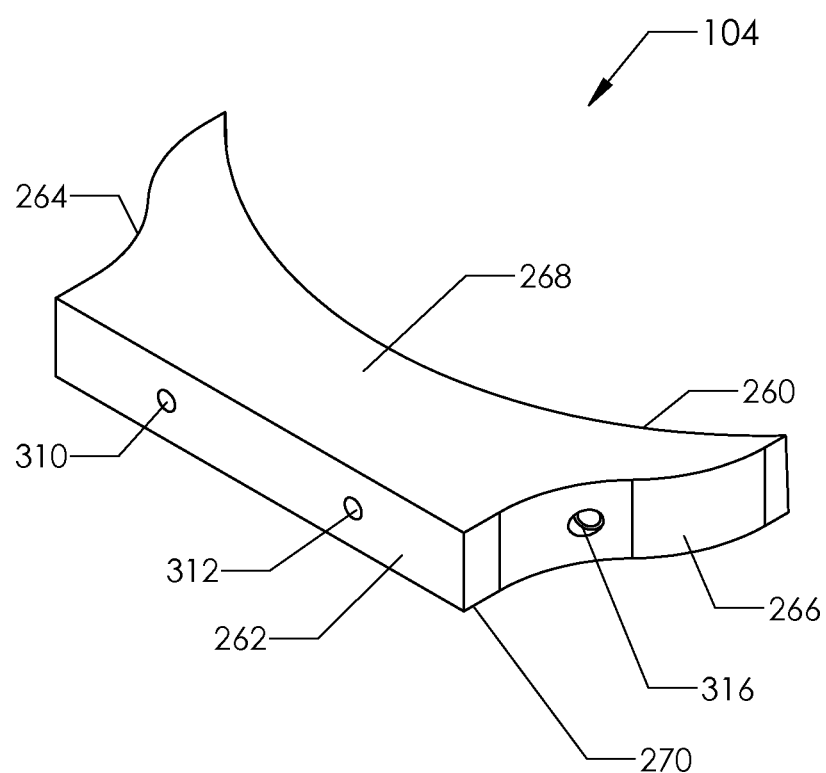
FIG. 8 is a schematic of a first bucket mounting plate utilized in the cart assembly of FIG. 1.
Figure 9:
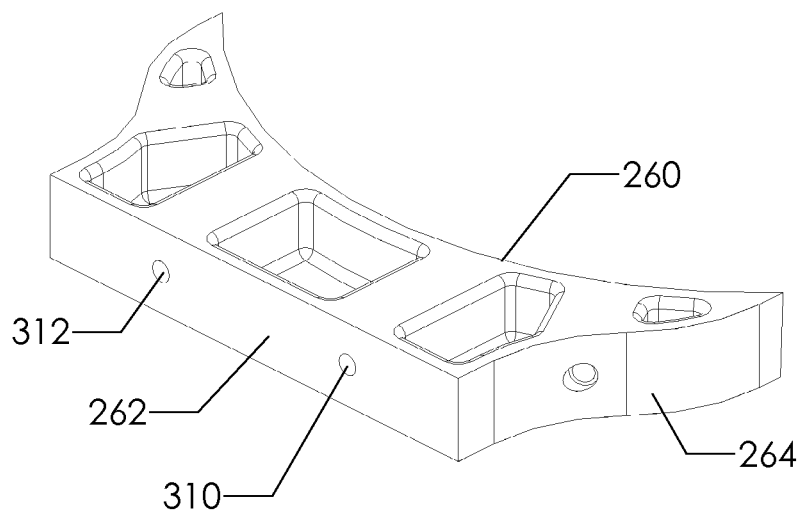
FIG. 9 is another schematic of the first bucket mounting plate of FIG. 8.
Figure 10:
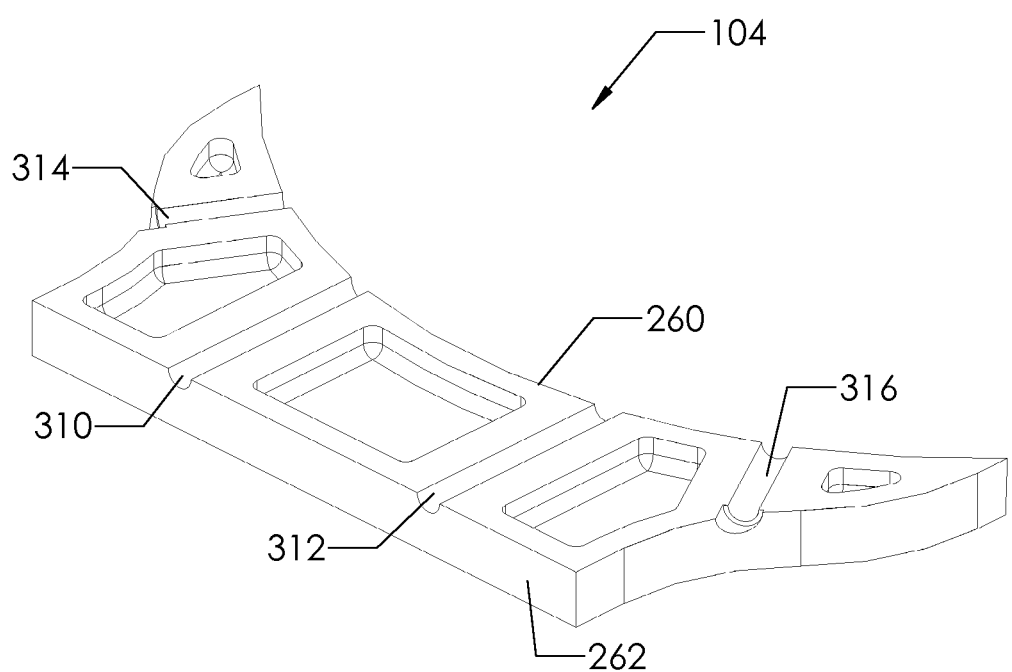
FIG. 10 is a cross-sectional schematic of the first bucket mounting plate of FIG. 8.
Figure 11:
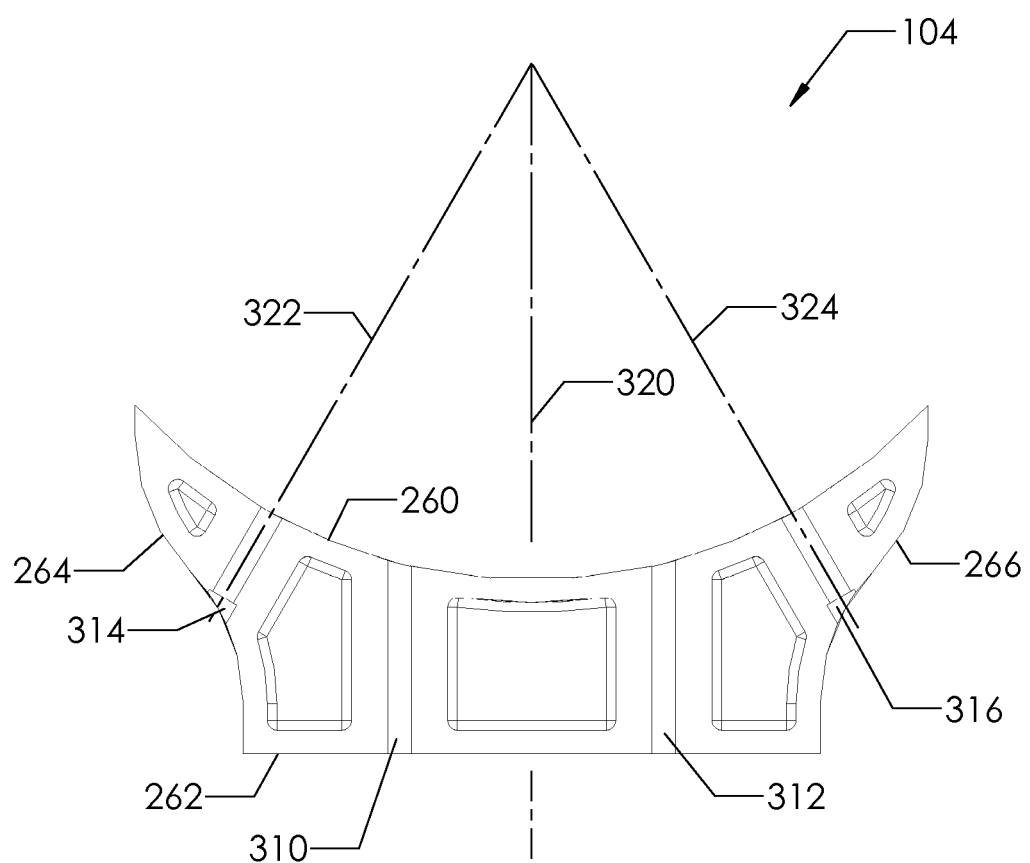
FIG. 11 is another cross-sectional schematic of the first bucket mounting plate of FIG. 8.
Figure 12:
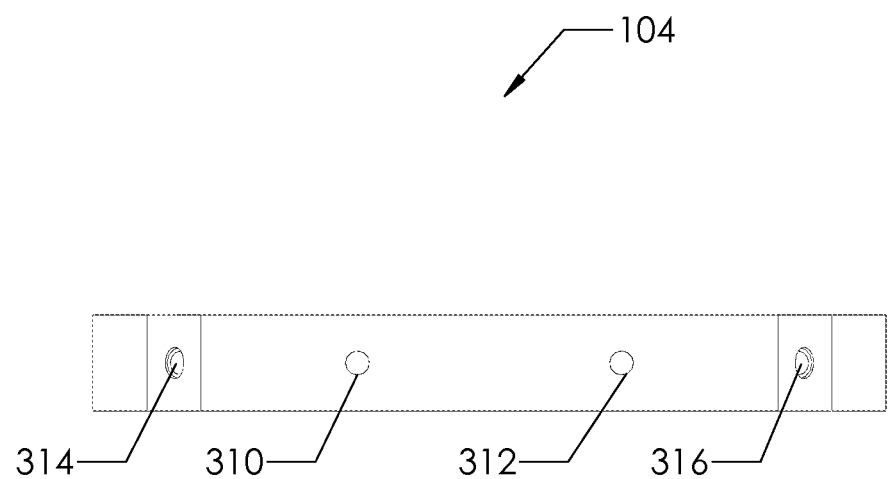
FIG. 12 is another schematic of the first bucket mounting plate of FIG. 8.

Referring to FIGS. 2, 4 and 8, the bolt 110 is disposed through the aperture 220 of the first cross-member 194 of the frame assembly 100, the aperture 310 in the first bucket mounting plate 104, and the aperture 60 in the bucket 12 to the couple together the frame assembly 100, the first bucket mounting plate 104, and the bucket 12.

The bolt 112 is disposed through the aperture 222 of the first cross-member 194 of the frame assembly 100, the aperture 312 in the first bucket mounting plate 104, and the aperture 62 in the bucket 12 to the couple together the frame assembly 100, the first bucket mounting plate 104, and the bucket 12.

The bolt 114 is disposed through the aperture 314 (shown in FIG. 10) in the first bucket mounting plate 104 and the aperture 64 in the bucket 12 to the couple together the first bucket mounting plate 104 and the bucket 12.

The bolt 116 is disposed through the aperture 316 in the first bucket mounting plate 104 and the aperture 66 in the bucket 12 to the couple together the first bucket mounting plate 104 and the bucket 12.

The bolts 110, 112, 114, 116 each have respective nuts that are coupled thereto and abut against an interior surface of the bucket 12.

Figure 13:
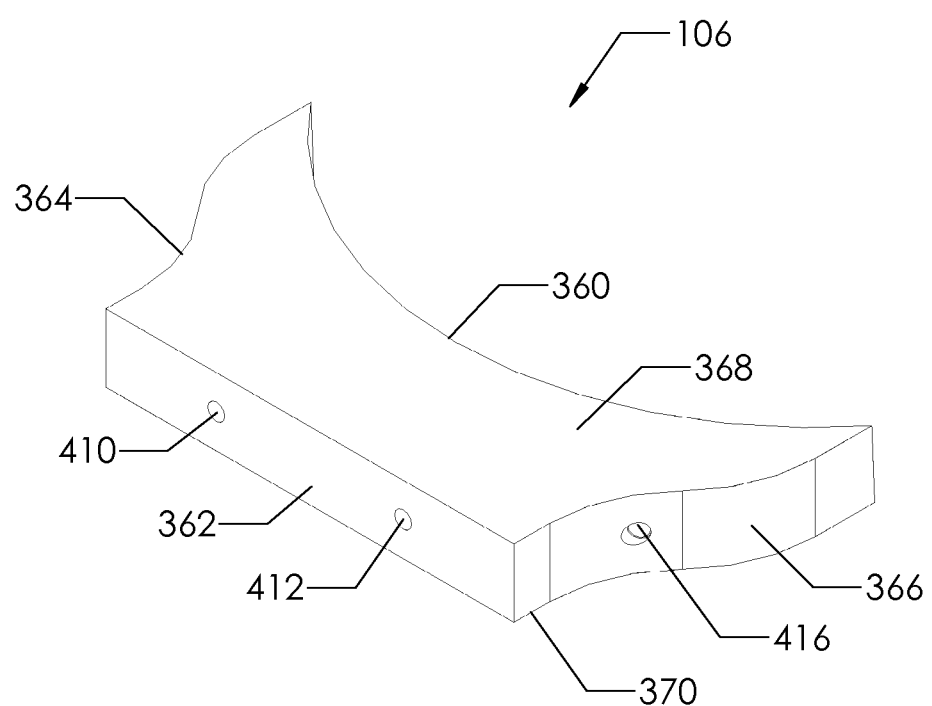
FIG. 13 is a schematic of a second bucket mounting plate utilized in the cart assembly of FIG. 1.

Referring to FIGS. 4 and 13, the second bucket mounting plate 106 is provided to couple the frame assembly 100 to the bucket 12. The second bucket mounting plate 106 has an arcuate-shaped surface 360, a substantially flat mounting surface 362, first and second side surfaces 364, 366, a top surface 368, and a bottom surface 370. The second bucket mounting plate 106 further includes a longitudinal axis 420 extending through the substantially flat mounting surface 362 and the arcuate-shaped surface 360. The substantially flat mounting surface 362 is disposed opposite to the arcuate-shaped surface 360. The first and second side surfaces 364, 366 extend between the substantially flat mounting surface 362 and the arcuate-shaped surface 360. The second bucket mounting plate 106 further includes apertures 410, 412, 414, 416 extending therethrough. The apertures 410, 412 extend from the substantially flat mounting surface 362 to the arcuate-shaped surface 360 substantially parallel to the axis 420. The aperture 414 extends from the first side surface 364 to the arcuate-shaped surface 360 at an acute angle relative to the axis 420. The aperture 414 is centered about the axis 422. The aperture 416 extends from the second side surface 366 to the arcuate-shaped surface 360 at an acute angle relative to the axis 420. The aperture 416 is centered about the axis 424. The top surface 368 and the bottom surface 370 extend substantially parallel to one another. In an exemplary embodiment, the second bucket mounting plate 106 is constructed of plastic. However, in an alternative embodiment, the second bucket mounting plate 106 could be constructed of other materials such as aluminum or steel for example.

Referring to FIGS. 2, 4 and 13, the bolt 120 is disposed through the aperture 230 of the second cross-member 196 of the frame assembly 100, the aperture 410 in the second bucket mounting plate 106, and the aperture 70 in the bucket 12 to the couple together the frame assembly 100, the second bucket mounting plate 106, and the bucket 12.

The bolt 122 is disposed through the aperture 232 of the second cross-member 196 of the frame assembly 100, the aperture 412 in the second bucket mounting plate 106, and the aperture 72 in the bucket 12 to the couple together the frame assembly 100, the second bucket mounting plate 106, and the bucket 12.

Figure 14:
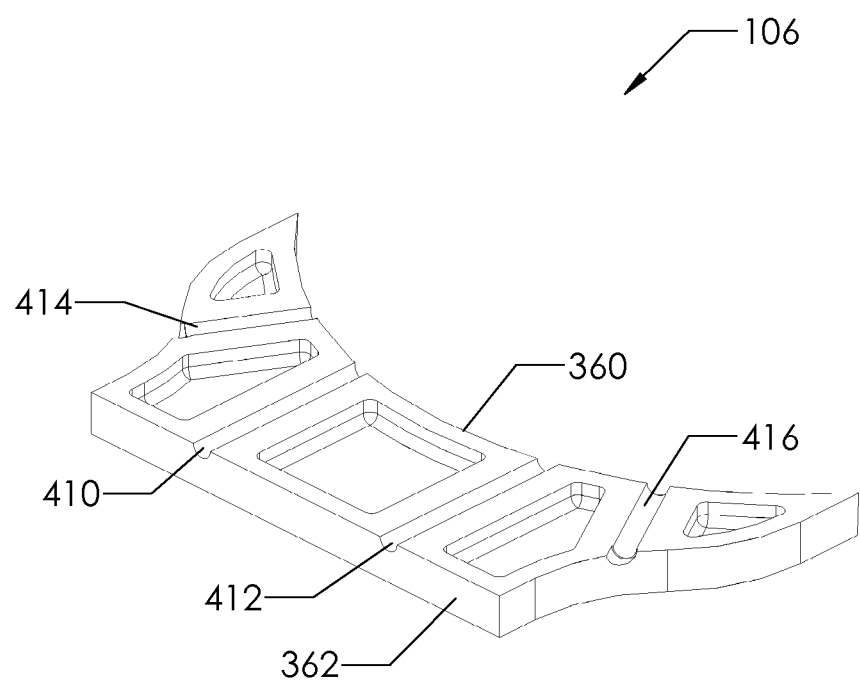
FIG. 14 is a cross-sectional schematic of the second bucket mounting plate of FIG. 13.
Figure 15:
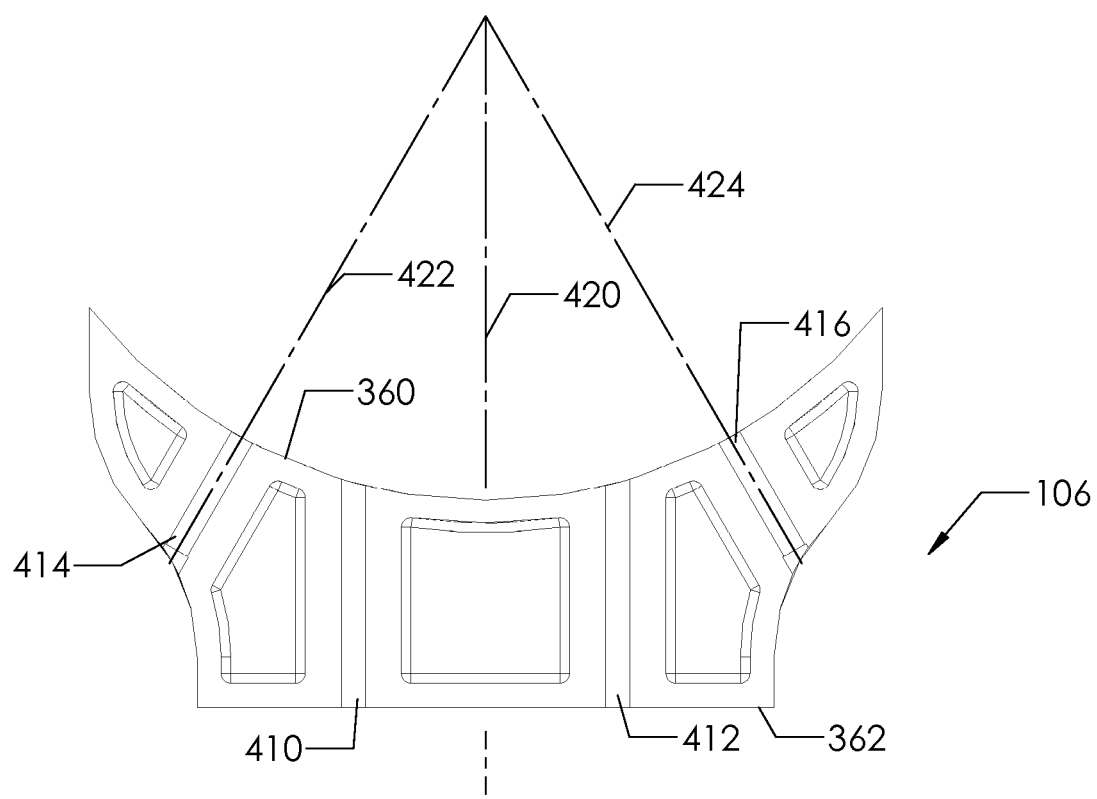
FIG. 15 is another cross-sectional schematic of the second bucket mounting plate of FIG. 13.
Figure 16:
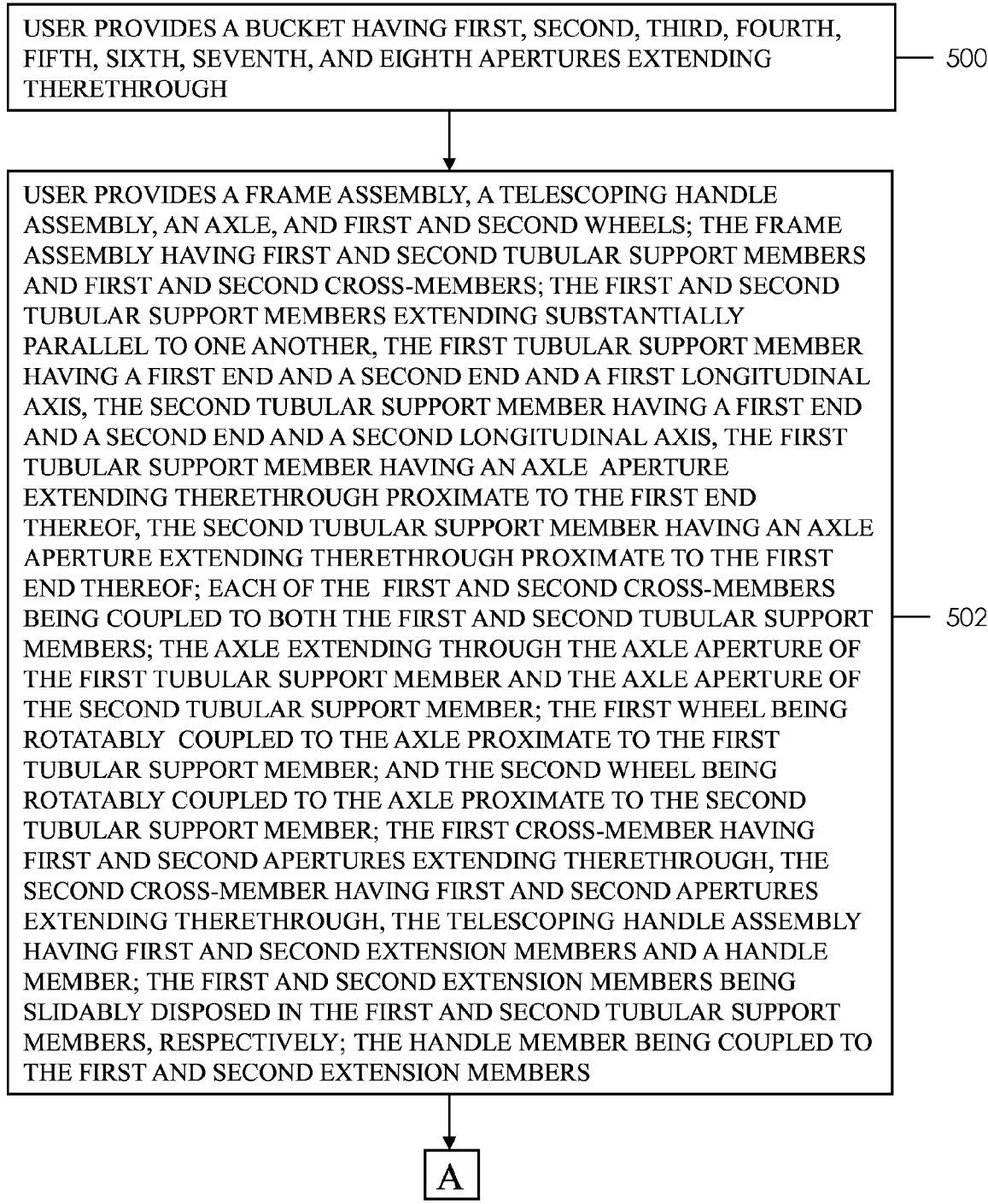
FIGS. 16-19 are flowcharts of a method for coupling a cart assembly to a bucket in accordance with another exemplary embodiment.
Figure 17:
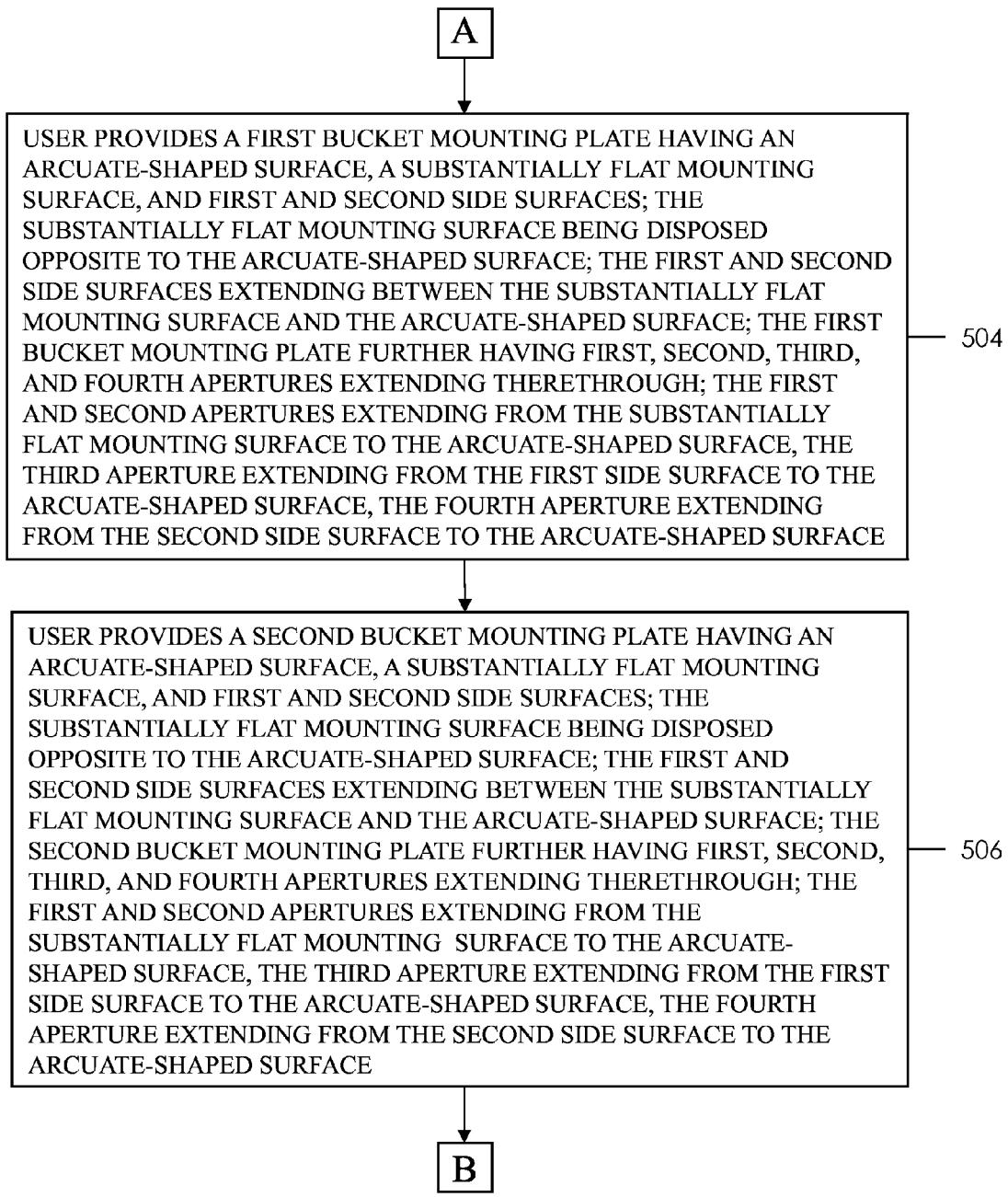
Figure 18:
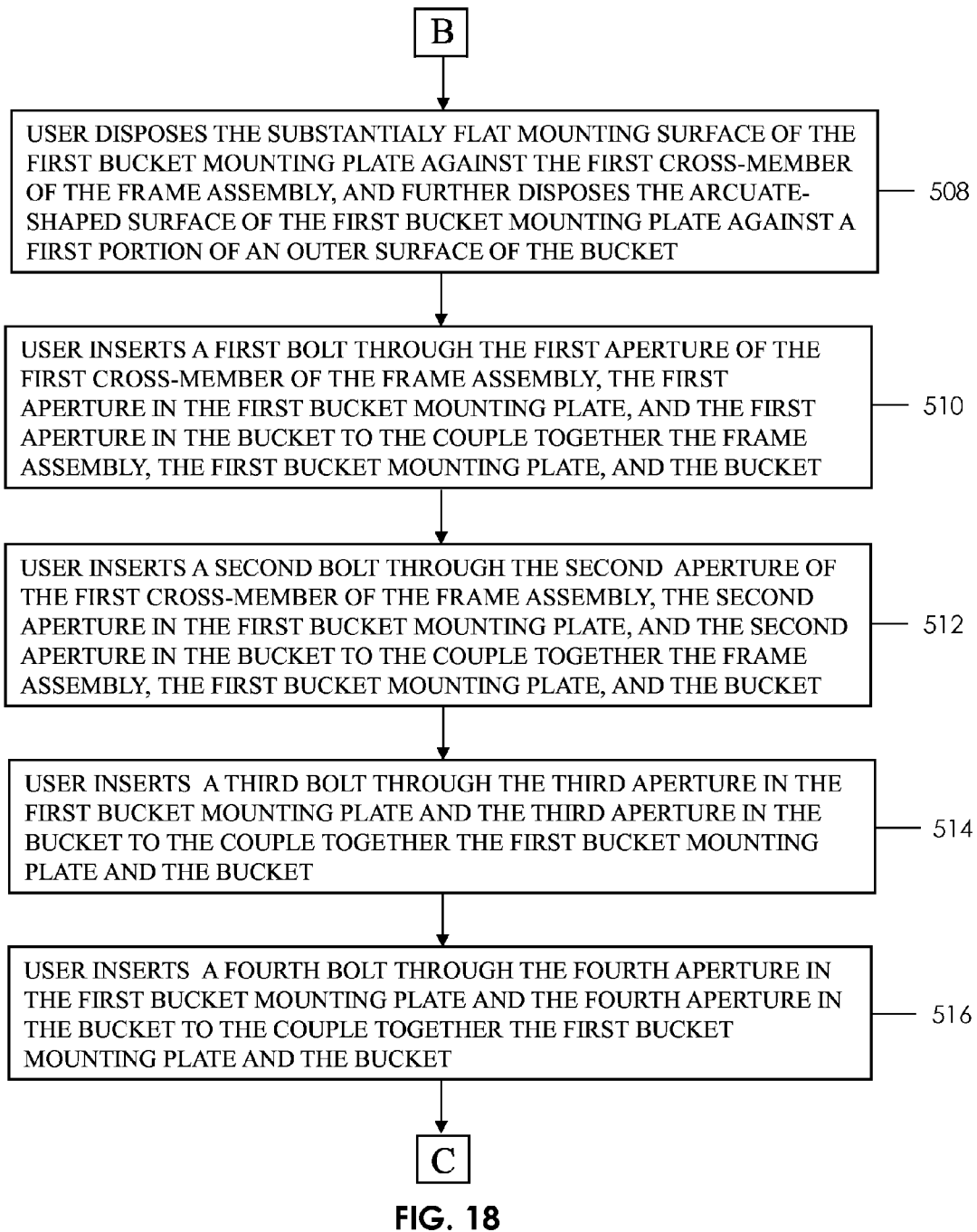
Figure 19:
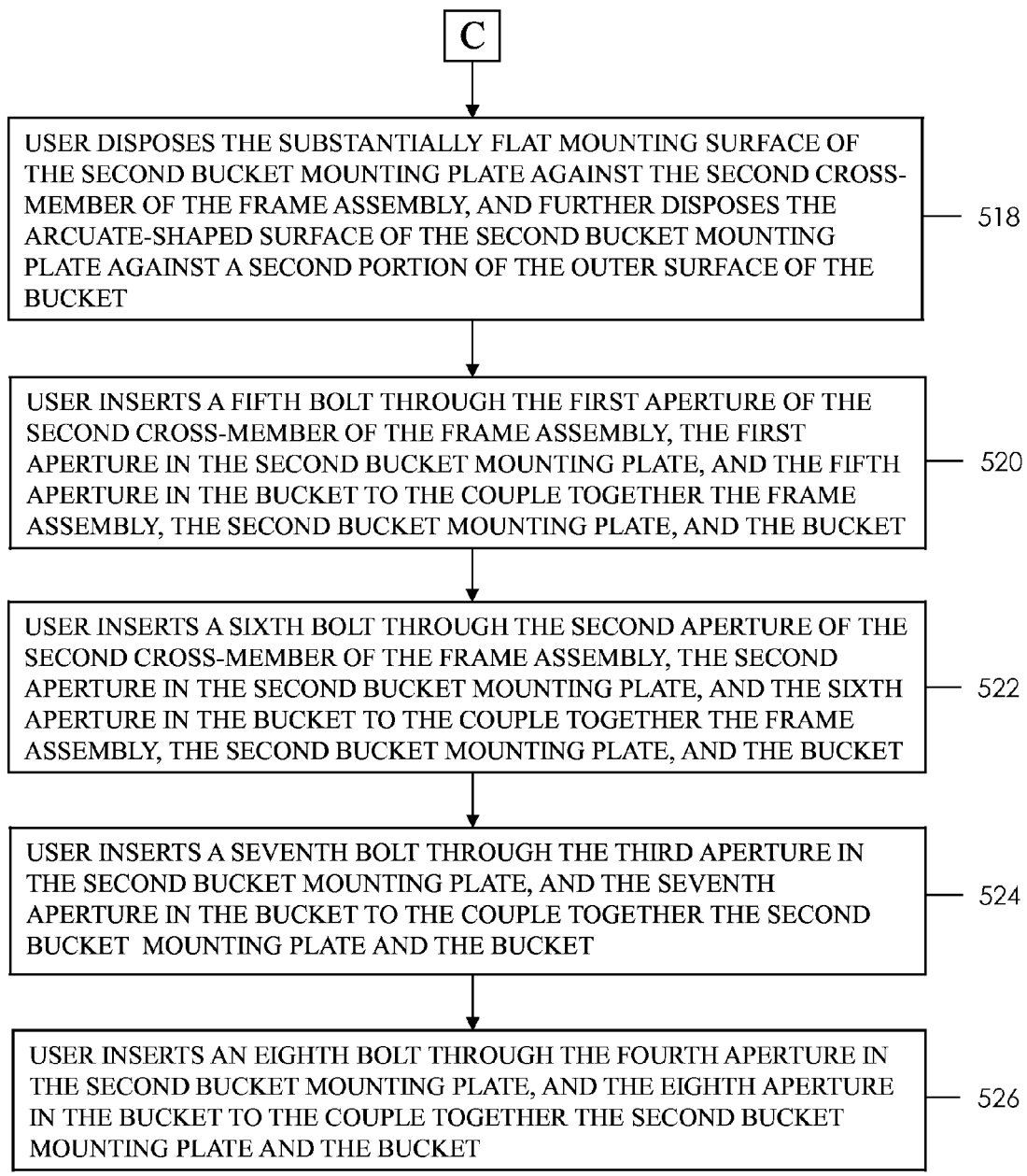

The bolt 124 is disposed through the aperture 414 (shown in FIG. 14) in the second bucket mounting plate 106 and the aperture 74 in the bucket 12 to the couple together the second bucket mounting plate 106 and the bucket 12.

The bolt 126 is disposed through the aperture 416 in the second bucket mounting plate 106 and the aperture 76 in the bucket 12 to the couple together the second bucket mounting plate 106 and the bucket 12.

The bolts 120, 122, 124, 126 each have respective nuts that are coupled thereto and abut against an interior surface of the bucket 12.

Referring to FIG. 7, the axle 144 extends through the axle aperture 204 of the first tubular support member 190 and the axle aperture 214 of the second tubular support member 192. The bushing 150 is disposed on the axle 144 between the first and second tubular support members 190, 192. The bushing 152 is disposed on the axle 144 on a first end of the axle 144. Further, the bushing 154 is disposed on the axle 144 on a second end of the axle 144.

The first wheel 140 is rotatably coupled to the axle 144 proximate to an outer side of the first tubular support member 190. The first wheel 140 has an aperture 450 extending therethrough. The bushing 152 is disposed on the axle 144, and the axle 144 and the bushing 152 extend through the aperture 450 of the first wheel 140 such that the first wheel 140 is rotatable about the bushing 152. An inner side of the first wheel 140 is disposed proximate to an outer side of the first tubular support member 190. The washer 160 is disposed on the axle 144 proximate to an outer side of the first wheel 140. Further, the nut 170 is coupled to the axle 144 such that the washer 160 is disposed between the nut 170 and the outer side of first wheel 140.

The second wheel 142 is rotatably coupled to the axle 144 proximate to an outer side of the second tubular support member 192. The second wheel 142 has an aperture 460 extending therethrough. The bushing 154 is disposed on the axle 144, and the axle 144 and the bushing 154 extend through the aperture 460 of the second wheel 142 such that the second wheel 142 is rotatable about the bushing 154. An inner side of the second wheel 142 is disposed proximate to an outer side of the second tubular support member 192. The washer 162 is disposed on the axle 144 proximate to an outer side of the second wheel 142. Further, the nut 172 is coupled to the axle 144 such that the washer 162 is disposed between the nut 172 and the outer side of second wheel 142.

Referring to FIGS. 2, 4, 7 and 16-19, a flowchart of a method for coupling the card assembly 10 to the bucket 12 in accordance with another exemplary embodiment will be explained.

At step 500, the user provides the bucket 10 having the apertures 60, 62, 64, 66, 70, 72, 74, 76 extending therethrough.

At step 502, the user provides the frame assembly 100, the telescoping handle assembly 102, the axle 144, and first and second wheels 140, 142. The frame assembly 100 having first and second tubular support members 190, 192 and first and second cross-members 194, 196. The first and second tubular support members 190, 192 extend substantially parallel to one another. The first tubular support member 190 has the first end 200 and the second end 202 and a first longitudinal axis 205. The second tubular support member 192 has the first end 210 and the second end 212 and the second longitudinal axis 215. The first tubular support member 190 has the axle aperture 204 extending therethrough proximate to the first end 200 thereof. The second tubular support member 192 has the axle aperture 214 extending therethrough proximate to the first end 210 thereof. Each of the first and second cross-members 194, 196 are coupled to both the first and second tubular support members 190, 192. The axle 144 extends through the axle aperture 204 of the first tubular support member 190 and the axle aperture 214 of the second tubular support member 192. The first wheel 140 is rotatably coupled to the axle 144 proximate to the first tubular support member 190. The second wheel 142 is rotatably coupled to the axle 144 proximate to the second tubular support member 192. The first cross-member 194 has apertures 220, 222 extending therethrough. The second cross-member 196 has apertures 230, 232 extending therethrough. The telescoping handle assembly 102 has first and second extension members 240, 242 and the handle member 244. The first and second extension members 240, 242 are slidably disposed in the first and second tubular support members 190, 192, respectively. The handle member 244 is coupled to the first and second extension members 240, 242.

At step 504, the user provides the first bucket mounting plate 104 having the arcuate-shaped surface 260, the substantially flat mounting surface 262, and first and second side surfaces 264, 266. The substantially flat mounting surface 262 is disposed opposite to the arcuate-shaped surface 260. The first and second side surfaces 264, 266 extend between the substantially flat mounting surface 262 and the arcuate-shaped surface 260. The first bucket mounting plate 104 further includes apertures 310, 312, 314, 316 extending therethrough. The apertures 310, 312 extend from the substantially flat mounting surface 262 to the arcuate-shaped surface 260. The aperture 314 extends from the first side surface 264 to the arcuate-shaped surface 260. The aperture 316 extends from the second side surface 266 to the arcuate-shaped surface 260.

At step 506, the user provides the second bucket mounting plate 106 having the arcuate-shaped surface 360, the substantially flat mounting surface 362, and first and second side surfaces 364, 366. The substantially flat mounting surface 362 is disposed opposite to the arcuate-shaped surface 360. The first and second side surfaces 364, 366 extend between the substantially flat mounting surface 362 and the arcuate-shaped surface 360. The second bucket mounting plate 106 further includes apertures 410, 412, 414, 416 extending therethrough. The apertures 410, 412 extend from the substantially flat mounting surface 362 to the arcuate-shaped surface 360. The aperture 414 extends from the first side surface 364 to the arcuate-shaped surface 360. The aperture 416 extends from the second side surface 366 to the arcuate-shaped surface 360.

At step 508, the user disposes the substantially flat mounting surface 262 of the first bucket mounting plate 104 against the first cross-member 194 of the frame assembly 100, and further disposes the arcuate-shaped surface 260 of the first bucket mounting plate 104 against a first portion of the outer surface 34 of the bucket 12.

At step 510, the user inserts the bolt 110 through the aperture 220 of the first cross-member 194 of the frame assembly 100, the aperture 310 in the first bucket mounting plate 104, and the aperture 60 in the bucket 12 to the couple together the frame assembly 100, the first bucket mounting plate 104, and the bucket 12.

At step 512, the user inserts the bolt 112 through the aperture 22 of the first cross-member 194 of the frame assembly 100, the aperture 312 in the first bucket mounting plate 104, and the aperture 62 in the bucket 12 to the couple together the frame assembly 100, the first bucket mounting plate 104, and the bucket 12.

At step 514, the user inserts the bolt 114 through the aperture 314 in the first bucket mounting plate 104 and the aperture 64 in the bucket 12 to the couple together the first bucket mounting plate 104 and the bucket 12.

At step 516, the user inserts the bolt 116 through the aperture 316 in the first bucket mounting plate 104 and the aperture 66 in the bucket 12 to the couple together the first bucket mounting plate 104 and the bucket 12.

At step 518, the user disposes the substantially flat mounting surface 362 of the second bucket mounting plate 106 against the second cross-member 196 of the frame assembly 100, and further disposes the arcuate-shaped surface 360 of the second bucket mounting plate 106 against a second portion of the outer surface of the bucket 12.

At step 520, the user inserts the bolt 120 through the aperture 230 of the second cross-member 196 of the frame assembly 100, the aperture 410 in the second bucket mounting plate 106, and the aperture 70 in the bucket 12 to the couple together the frame assembly 100, the second bucket mounting plate 106, and the bucket 12.

At step 522, the user inserts the bolt 122 through the aperture 232 of the second cross-member 196 of the frame assembly 100, the aperture 412 in the second bucket mounting plate 106, and the aperture 72 in the bucket 12 to the couple together the frame assembly 100, the second bucket mounting plate 106, and the bucket 12.

At step 524, the user inserts the bolt 124 through the aperture 414 in the second bucket mounting plate 106, and the aperture 74 in the bucket 12 to the couple together the second bucket mounting plate 106 and the bucket 12.

At step 526, the user inserts the 126 bolt through the aperture 416 in the second bucket mounting plate 106, and the aperture 76 in the bucket 12 to the couple together the second bucket mounting plate 106 and the bucket 12.

The cart assembly 10 provides a substantial advantage over other cart assemblies. In particular, the cart assembly 10 utilizes a frame assembly and a telescoping handle assembly to allow a user to easily transport a bucket. Further, the cart assembly utilizes first and second bucket mounting plates each having an arcuate-shaped surface for contacting an arcuate-shaped outer surface of the bucket.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A cart assembly for transporting a bucket, the bucket having first and second apertures extending therethrough, comprising:

a frame assembly, a telescoping handle assembly, and first and second wheels; the frame assembly having first and second apertures extending therethrough, the telescoping handle assembly being slidably coupled to a first end portion of the frame assembly, the first and second wheels being rotatably coupled to a second end portion of the frame assembly;

a first bucket mounting plate being coupled to the frame assembly and extending outwardly from the frame assembly, the first bucket mounting plate having an arcuate-shaped surface configured to abut against a first portion of an outer surface of the bucket, the first bucket mounting plate having a first aperture extending therethrough;

a first bolt configured to extend through the first aperture of the frame assembly, the first aperture in the first bucket mounting plate, and the first aperture in the bucket to the couple together the frame assembly, the first bucket mounting plate, and the bucket;

a second bucket mounting plate being coupled to the frame assembly and extending outwardly from the frame assembly, the second bucket mounting plate having an arcuate-shaped surface configured to abut against a second portion of the outer surface of the bucket, the second bucket mounting plate having a first aperture extending therethrough; and a second bolt configured to extend through the second aperture of the frame assembly, the first aperture in the second bucket mounting plate, and the second aperture in the bucket to the couple together the frame assembly, the second bucket mounting plate, and the bucket.

2. The cart assembly of claim 1, wherein:

the first bucket mounting plate further includes a substantially flat mounting surface and first and second side surfaces; the substantially flat mounting surface being disposed opposite to the arcuate-shaped surface of the first bucket mounting plate; the first and second side surfaces extending between the substantially flat mounting surface and the arcuate-shaped surface of the first bucket mounting plate; the first bucket mounting plate further having a first axis extending through the substantially flat mounting surface and the arcuate-shaped surface of the first bucket mounting plate, the first axis extending substantially perpendicular to the substantially flat mounting surface;

the first aperture in the bucket mounting plate extending through the substantially flat mounting surface and the arcuate-shaped surface of the first bucket mounting plate.

3. The cart assembly of claim 2, wherein the first bucket mounting plate further includes second, third and fourth apertures extending therethrough, the second aperture extending through the substantially flat mounting surface and the arcuate-shaped surface of the first bucket mounting plate, the third aperture extending through the first side surface and the arcuate-shaped surface of the first bucket mounting plate, the fourth aperture extending through the second side surface and the arcuate-shaped surface of the first bucket mounting plate.

4. The cart assembly of claim 3, wherein the bucket further includes third, fourth, and fifth apertures extending therethrough, the cart assembly further comprising third, fourth, and fifth bolts;
the third bolt configured to extend through a third aperture of the frame assembly, the second aperture in the first bucket mounting plate, and the third aperture in the bucket to couple together the frame assembly, the first bucket mounting plate, and the bucket;
the fourth bolt configured to extend through the third aperture in the first bucket mounting plate, and the fourth aperture in the bucket to couple together the first bucket mounting plate and the bucket; and
the fifth bolt configured to extend through the fourth aperture in the first bucket mounting plate, and the fifth aperture in the bucket to couple together the first bucket mounting plate and the bucket.

5. The cart assembly of claim 1, wherein the frame assembly comprises:
first and second tubular support members, an axle, and first and second cross-members; the first and second tubular support members extending substantially parallel to one another, the first tubular support member having a first end and a second end and a first longitudinal axis, the second tubular support member having a first end and a second end and a second longitudinal axis, the first tubular support member having an axle aperture extending therethrough proximate to the first end thereof, the second tubular support member having an axle aperture extending therethrough proximate to the first end thereof;
each of the first and second cross-members being coupled to both the first and second tubular support members;
the axle extending through the axle aperture of the first tubular support member and the axle aperture of the second tubular support member;
the first wheel being rotatably coupled to the axle proximate to the first tubular support member; and
the second wheel being rotatably coupled to the axle proximate to the second tubular support member.

6. The cart assembly of claim 5, wherein the first and second bucket mounting plates being further coupled to the first and second cross-members, respectively.

7. The cart assembly of claim 5, wherein the telescoping handle assembly comprises:
first and second extension members and a handle member;
the first and second extension members being slidably disposed in the first and second tubular support members, respectively; and
the handle member being coupled to the first and second extension members.

8. A method of coupling a cart assembly to a bucket, the bucket having first and second apertures extending therethrough, comprising:
providing a frame assembly, a telescoping handle assembly, and first and second wheels; the frame assembly having first and second apertures extending therethrough, the telescoping handle assembly being slidably coupled to a first end portion of the frame assembly, the first and second wheels being rotatably coupled to a second end portion of the frame assembly;
providing a first bucket mounting plate having an arcuate-shaped surface, the first bucket mounting plate further having a first aperture extending therethrough;
providing a second bucket mounting plate having an arcuate-shaped surface, the second bucket mounting plate further having a first aperture extending therethrough;
disposing the first bucket mounting plate against the frame assembly and further disposing the arcuate-shaped surface of the first bucket mounting plate against a first portion of an outer surface of the bucket;
inserting a first bolt through the first aperture of the frame assembly, the first aperture in the first bucket mounting plate, and the first aperture in the bucket to the couple together the frame assembly, the first bucket mounting plate, and the bucket;
disposing the second bucket mounting plate against the frame assembly and further disposing the arcuate-shaped surface of the second bucket mounting plate against a second portion of the outer surface of the bucket; and
inserting a second bolt through the second aperture of the frame assembly, the first aperture in the second bucket mounting plate, and the second aperture in the bucket to the couple together the frame assembly, the second bucket mounting plate, and the bucket.

\* \* \* \* \*